United States Patent
Cho et al.

(10) Patent No.: US 10,800,421 B2
(45) Date of Patent: Oct. 13, 2020

(54) SHIFT CONTROL METHOD FOR VEHICLE WITH DCT

(71) Applicants: Hyundai Motor Company, Seoul (KR); Kia Motors Corporation, Seoul (KR)

(72) Inventors: Sung Hyun Cho, Yongin-si (KR); Hwan Hur, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/512,783

(22) Filed: Jul. 16, 2019

(65) Prior Publication Data
US 2020/0276976 A1  Sep. 3, 2020

(30) Foreign Application Priority Data
Feb. 28, 2019  (KR) .................. 10-2019-0024313

(51) Int. Cl.
| B60W 30/19 | (2012.01) |
| B60W 10/02 | (2006.01) |
| B60W 10/06 | (2006.01) |
| B60W 10/113 | (2012.01) |
| F16H 61/04 | (2006.01) |
| F16H 61/682 | (2006.01) |

(52) U.S. Cl.
CPC ............ *B60W 30/19* (2013.01); *B60W 10/02* (2013.01); *B60W 10/06* (2013.01); *B60W 10/113* (2013.01); *F16H 61/0403* (2013.01); *F16H 61/0437* (2013.01); *F16H 61/682* (2013.01); *B60W 2510/0657* (2013.01); *B60W 2710/021* (2013.01); *B60W 2710/0666* (2013.01); *B60W 2710/1005* (2013.01); *B60Y 2300/19* (2013.01)

(58) Field of Classification Search
None
See application file for complete search history.

(56) References Cited

U.S. PATENT DOCUMENTS

| 7,261,671 B2 | 8/2007 | Ortmann et al. |
| 7,331,899 B2 | 2/2008 | Ortmann et al. |
| (Continued) | | |

FOREIGN PATENT DOCUMENTS

| JP | H09-331602 A | 12/1997 |
| JP | 2012-228961 A | 11/2012 |
| (Continued) | | |

*Primary Examiner* — Dirk Wright
(74) *Attorney, Agent, or Firm* — Morgan, Lewis & Bockius LLP

(57) ABSTRACT

A shift control method for a vehicle with a double clutch transmission (DCT) is configured such that when a power-on upshift is initiated, during a target time for a controller to perform a torque phase, a release-side clutch is gradually released, an engine torque is gradually increased to a basic engine torque or more, and an engagement-side clutch torque is increased according to an increase in the engine torque and a vehicle speed; and when the release-side clutch is completely released, the controller reduces the engine torque while gradually reducing the engagement-side clutch torque to be equal to the basic engine torque, to perform an inertia phase such that an engine speed is synchronized with an engagement-side clutch speed.

10 Claims, 3 Drawing Sheets

(56) References Cited

U.S. PATENT DOCUMENTS

| | | | | |
|---|---|---|---|---|
| 8,328,688 | B2* | 12/2012 | Fujii | F16H 61/061 477/155 |
| 8,529,405 | B2* | 9/2013 | Fujii | F16H 61/061 477/155 |
| 8,825,325 | B2* | 9/2014 | Marcigliano | F16D 48/068 701/68 |
| 9,140,359 | B2* | 9/2015 | Porto | F16H 61/0437 |
| 9,458,932 | B2* | 10/2016 | Cho | F16D 48/062 |
| 10,065,649 | B2* | 9/2018 | Dunfee, II | B60W 10/06 |
| 10,166,989 | B2* | 1/2019 | Teslak | B60W 10/02 |
| 10,464,562 | B2* | 11/2019 | Cho | B60W 10/11 |
| 10,556,594 | B2* | 2/2020 | Kim | F16H 61/04 |

FOREIGN PATENT DOCUMENTS

| | | | |
|---|---|---|---|
| JP | 2013-039912 | A | 2/2013 |
| KR | 10-1724913 | B1 | 4/2017 |
| KR | 10-2018-0030305 | A | 3/2018 |
| KR | 10-1878098 | B1 | 7/2018 |

\* cited by examiner

SHIFT CONTROL METHOD FOR VEHICLE WITH DCT

CROSS REFERENCE TO RELATED APPLICATION

The present application claims priority to Korean Patent Application No. 10-2019-0024313, filed Feb. 28, 2019, the entire contents of which is incorporated herein for all purposes by this reference.

BACKGROUND OF THE INVENTION

Field of the Invention

The present invention relates to a technology for shift control for a vehicle with a dual clutch transmission (DCT).

Description of Related Art

Power-on upshift is a process in which shift is performed from a low to high speed gear as a vehicle is accelerated when a driver operates an accelerator pedal.

Here, the power transmitted from the engine to the drive wheel changes from a state of being transmitted through a large gear ratio to a state of being transmitted through a small gear ratio. Due to the gear ratio change caused by the shift, the torque transmitted to the drive wheel of the vehicle is lowered, which causes the driver to feel the acceleration feeling less, and the feeling of acceleration deterioration experienced by the driver is referred to as a "SAG feeling".

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift control method for a vehicle with a double clutch transmission (DCT), in which deterioration of the acceleration feeling due to gear ratio change is reduced when a power-on upshift is performed in a vehicle with a double clutch transmission (DCT), so that the driver can feel the continuous acceleration feeling, improving the transmission feeling, and ultimately increasing the commerciality of the vehicle.

In various aspects of the present invention, there is provided a shift control method for a vehicle with a double clutch transmission (DCT), the control method including: an initiation determination step of, by a controller, determining whether a power-on upshift is initiated; a handover step of, during a target time for the controller to perform a torque phase, gradually releasing a release-side clutch, increasing an engine torque from a basic engine torque to a corrected engine torque in consideration of a gear ratio difference between a current gear and a target gear, and controlling an engagement-side clutch using an engagement-side clutch torque determined in consideration of the corrected engine torque and a vehicle speed; and when the handover step is completed, a synchronization step of, by the controller, reducing the engine torque while controlling the engagement-side clutch in consideration of a torque difference, which is a difference between the corrected engine torque and the engagement-side clutch torque at completion of the handover step, to perform an inertia phase such that an engine speed is synchronized with an engagement-side clutch speed.

In the initiation determination step, it may be further determined whether gear engagement of the target gear is completed; and the handover step may be initiated when it is determined that the power-on upshift is initiated and the gear engagement of the target gear is completed in the initiation determination step.

In the handover step, the corrected engine torque may be determined such that a difference between the basic engine torque multiplied by a gear ratio of the current gear and the basic engine torque multiplied by a gear ratio of the target gear is divided by the gear ratio of the target gear, and a result is multiplied by a progress ratio of the torque phase, and is added to the basic engine torque.

The corrected engine torque may be determined such that a difference between the basic engine torque multiplied by a gear ratio of the current gear and the basic engine torque multiplied by a gear ratio of the target gear is divided by the gear ratio of the target gear, and a result is multiplied by a progress ratio of the torque phase and a correction factor determined according to the basic engine torque and the target gear, and is added to the basic engine torque.

In the handover step, the engagement-side clutch torque may be determined from a map including a relationship between the vehicle speed and the engagement-side clutch torque according to the corrected engine torque.

In the synchronization step, the engagement-side clutch torque may be determined as a larger value of a value of adding a ramp down torque to a value of subtracting the torque difference from the corrected engine torque in an immediately preceding control cycle, and a value of subtracting the torque difference from the basic engine torque.

In the synchronization step, the engine torque may be reduced to less than the basic engine torque.

In various aspects of the present invention, there is provided a shift control method for a vehicle with a double clutch transmission (DCT), the control method being configured such that: when a power-on upshift is initiated, during a target time for a controller to perform a torque phase, a release-side clutch is gradually released, an engine torque is gradually increased to a basic engine torque or more, and an engagement-side clutch torque is increased according to an increase in the engine torque and a vehicle speed; and when the release-side clutch is completely released, the controller reduces the engine torque while gradually reducing the engagement-side clutch torque to be equal to the basic engine torque, to perform an inertia phase such that an engine speed is synchronized with an engagement-side clutch speed.

According to an exemplary embodiment of the present invention, it is advantageous in that deterioration of the acceleration feeling due to gear ratio change is reduced when a power-on upshift is performed in a vehicle with a double clutch transmission (DCT), so that the driver can feel the continuous acceleration feeling, improving the transmission feeling, and ultimately increasing the commerciality of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
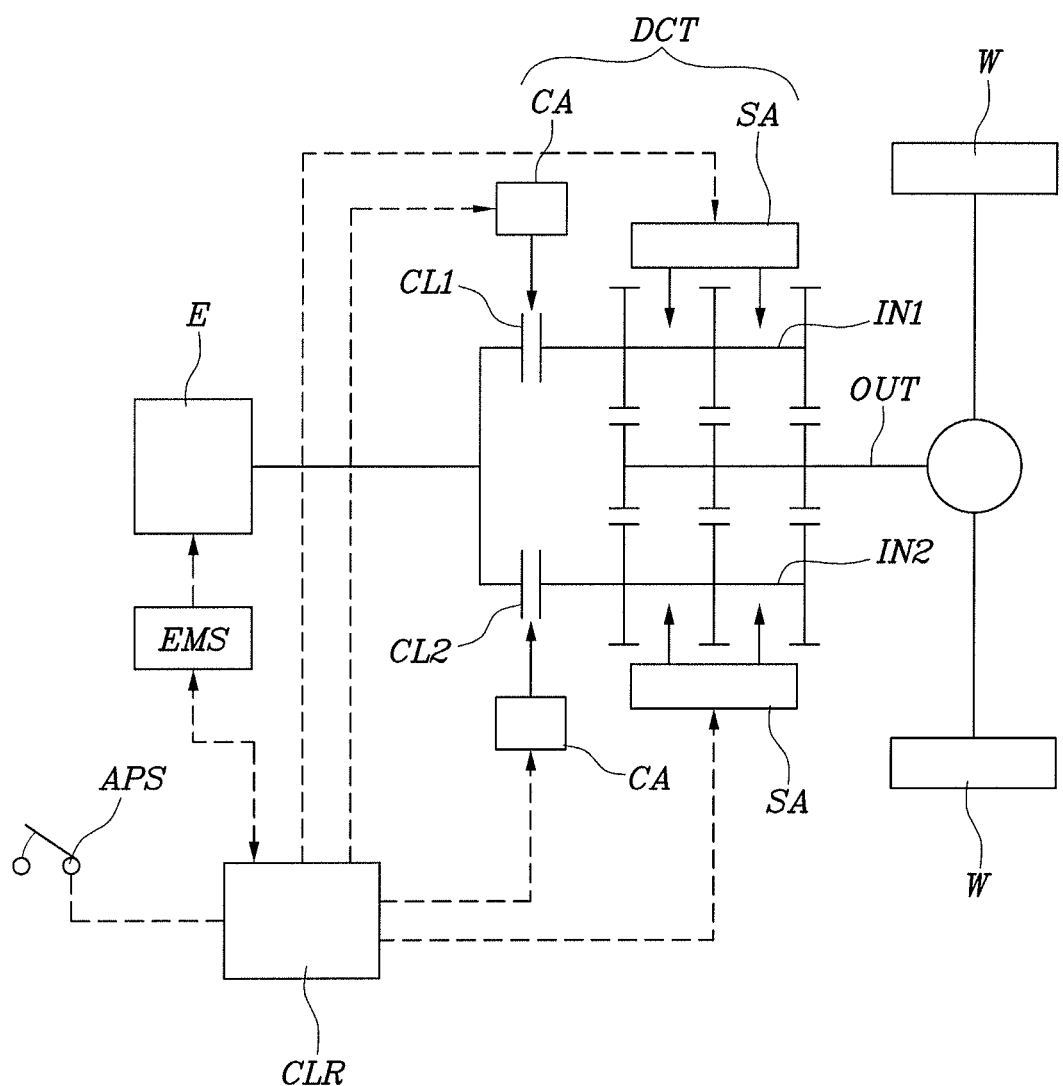
FIG. 1 is a schematic diagram showing a vehicle with a double clutch transmission (DCT) to which the present invention is applicable.
Figure 2:
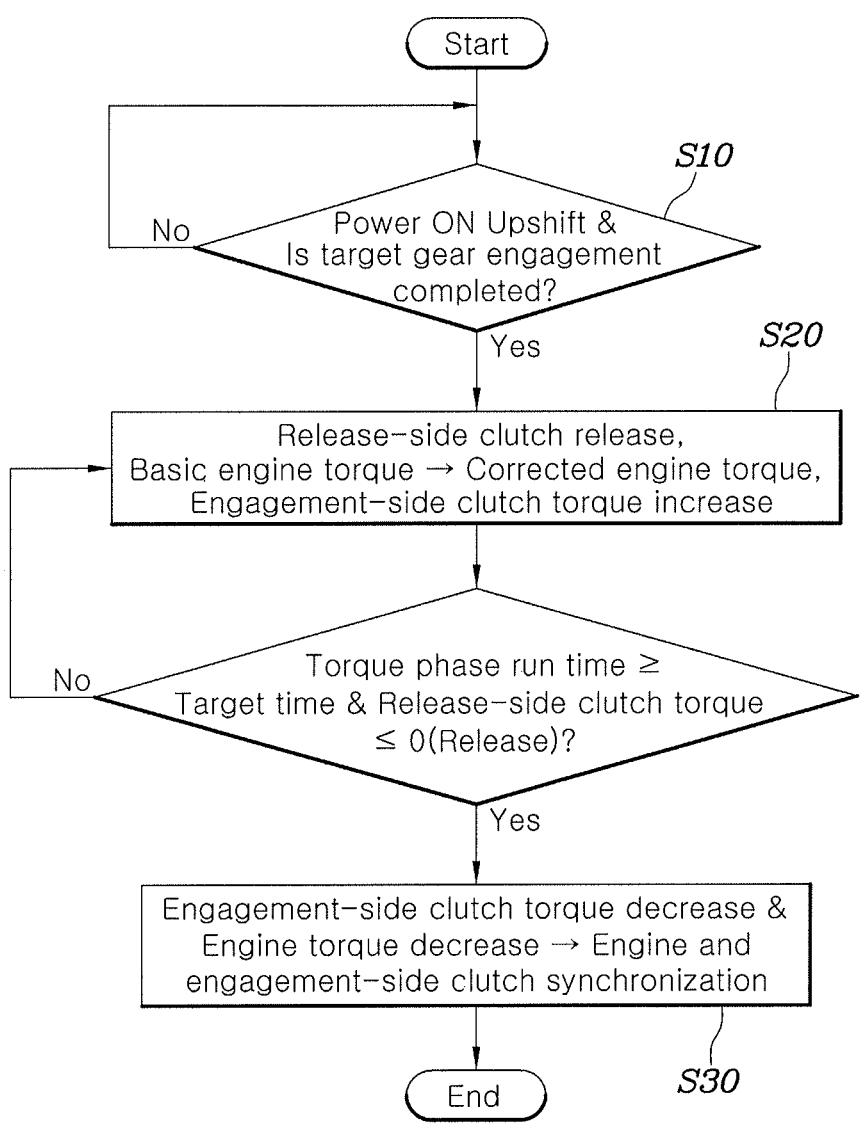
FIG. 2 is a flowchart showing an exemplary embodiment of a shift control method for a vehicle with a double clutch transmission (DCT) according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an exemplary embodiment of the present invention will be described in detail with reference to the accompanying drawings.

FIG. 1 is a schematic diagram showing a vehicle with a double clutch transmission (DCT) to which the present invention is applicable, in which power of an engine E is transmitted to a first input shaft IN1 and a second input shaft IN2 of the DCT via a first clutch CL1 and a second clutch CL2, and then is supplied to drive wheels W through an output shaft OUT.

Furthermore, a clutch actuator CA for driving the first clutch CL1 and the second clutch CL2, and a shift actuator SA for performing shift by selecting and shifting functions are provided and controlled by a controller CLR, so that the shift is automatically performed.

The controller CLR is configured to receive a driver's accelerator pedal operation amount through an accelerator position sensor (APS), and receive other information such as the speed and a torque of the engine, and vehicle speed to control the clutch actuator CA and the shift actuator SA, automatically performing DCT shift according to the driving conditions of the vehicle.

Meanwhile, the engine is controlled by a separate engine management system (EMS), and the controller CLR communicates with the EMS to receive information related to the engine, and when the EMS is requested to adjust the engine torque according to the driving conditions and the shift conditions of the vehicle, the EMS controls the engine in a response to the request.

For reference, the above described controller CLR may be configured as a transmission management system (TMS), and in some cases, may be configured as an integrated control system that integrates the EMS and TMS.

Herein, the first clutch CL1 and the second clutch CL2 are configured such that one of the clutches is engaged while the other one is released during the shift, and thus, depending on the shift condition, one of the two clutches is a release-side clutch which is separated from the engine and the other is an engagement-side clutch which is engaged with the engine.

Figure 3:
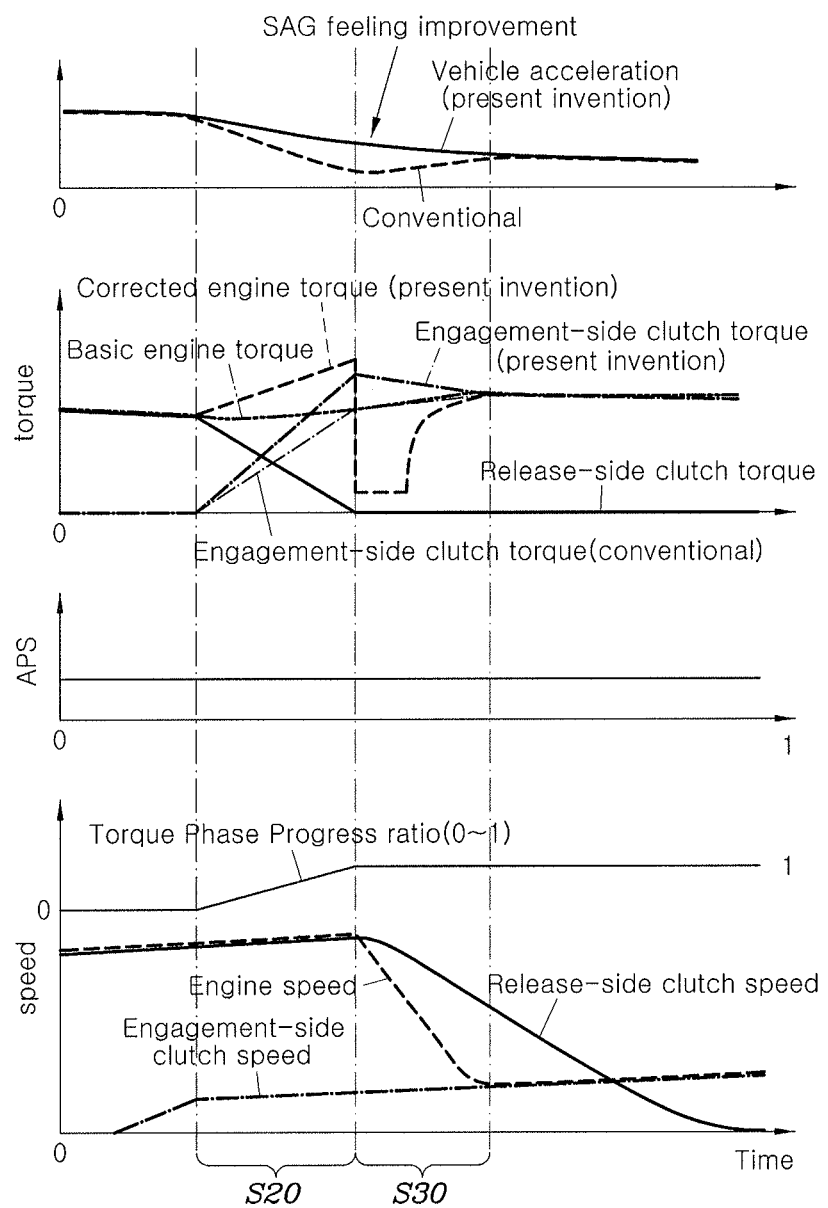
FIG. 3 is a graph showing the shift control method according to an exemplary embodiment of the present invention.

Referring to FIG. 3, an exemplary embodiment of a shift control method for a vehicle with a double clutch transmission (DCT) according to an exemplary embodiment of the present invention may include an initiation determination step S10 of, a controller CLR, determining whether a power-on upshift is initiated; a handover step S20 of, during a target time for the controller CLR to perform a torque phase, gradually releasing a release-side clutch, increasing an engine torque from a basic engine torque to a corrected engine torque in consideration of a gear ratio difference between a current gear and a target gear, and controlling an engagement-side clutch using an engagement-side clutch torque determined in consideration of the corrected engine torque and a vehicle speed; and when the handover step S20 is completed, a synchronization step S30 of, by the controller CLR, reducing the engine torque while controlling the engagement-side clutch in consideration of a torque difference, which is a difference between the corrected engine torque and the engagement-side clutch torque at completion of the handover step S20, to perform an inertia phase such that an engine speed is synchronized with an engagement-side clutch speed.

In other words, the present invention is configured such that: when the power-on upshift is initiated, during the target time for the controller CLR to perform a torque phase, the release-side clutch is gradually released, the engine torque is gradually increased to the basic engine torque or more, and the engagement-side clutch torque is increased according to an increase in the engine torque and the vehicle speed; and when the release-side clutch is completely released, the controller CLR reduces the engine torque while gradually reducing the engagement-side clutch torque to be equal to the basic engine torque, to perform the inertia phase such that the engine speed is synchronized with the engagement-side clutch speed.

Accordingly, the SAG feeling, which conventionally occurs when a situation where the power from the engine is transmitted to the drive wheel through the release-side clutch and current gear is converted into a situation where the power is transmitted to the drive wheel through the engagement-side clutch and the target gear during the torque phase, is reduced or eliminated by the increase in the engine torque and the increase in the engagement-side clutch torque, so that the driver can feel the linear change of the acceleration feeling or the feeling of continuous acceleration.

The 'basic engine torque' refers to a basic torque input from the engine to the DCT. In other words, the basic engine torque refers to a basic torque of the engine which is input to the DCT as the EMS determines and controls the engine according to the APS signal and the like in the situation where the controller CLR does not request the EMS to adjust the engine torque according to the shift conditions of the vehicle.

For reference, in the power-on upshift, the 'torque phase' refers to a process of gradually increasing the torque of the engagement-side clutch while gradually decreasing the torque of the release-side clutch as the shift is initiated, and the 'inertia phase' refers to a process of synchronizing the engine speed from the release-side clutch speed to the engagement-side clutch speed after the torque phase.

Furthermore, herein, the 'current gear' refers to a gear stage that was transmitting power to the drive wheel before the shift, and 'target gear' refers to a gear stage that will be used to transmit power to the drive wheel after the shift.

To ensure a more stable shift process, it is preferable that, in the initiation determination step S10, it is further determined whether gear engagement of the target gear is completed; and the handover step S20 is initiated when it is determined that the power-on upshift is initiated and the gear engagement of the target gear is completed in the initiation determination step S10.

In the handover step S20, the corrected engine torque may be determined such that a difference between the basic engine torque multiplied by a gear ratio of the current gear and the basic engine torque multiplied by a gear ratio of the target gear is divided by the gear ratio of the target gear, and a result is multiplied by a progress ratio of the torque phase and is added to the basic engine torque or is multiplied by a correction factor.

The correction factor, which is a value determined according to the basic engine torque and the target gear, may be determined such that the controller CLR obtains a correction factor value according to the basic engine torque and the target gear from a predetermined map and the value is applied. Herein, the larger the basic engine torque is, the smaller the correction factor is set to be, since the basic engine torque becomes larger, it becomes closer to the full load region of the engine, so that the margin to increase the engine torque is reduced.

Furthermore, since the step ratio between the lower gear stages is greater than the step ratio between the higher gear stages, the absolute torque reference to be managed by the engine torque is increased during the shift between lower gear stages, so that the correction factor is set to be smaller the smaller the gear ratio is because the target gear is relatively high.

The torque phase progress ratio is obtained by dividing the time at which the torque phase is initiated and has progressed by the target time to perform the torque phase, and thus, 0≤torque phase progress ratio≤1.

The above corrected engine torque may be expressed as the following equation:

$$Te\_A = Te + \left[ \frac{(Te \times GR_{current} - Te \times GR_{target})}{GR_{target}} \times TP\_R_{prog} \right] \times FC \quad \text{[Equation 1]}$$

Herein,
Te_A: Corrected engine torque
Te: Basic engine torque
$GR_{current}$: Gear ratio of current gear
$GR_{target}$: Gear ratio of target gear
$TP\_R_{prog}$: Torque phase progress ratio
FC: Correction factor In the handover step S20, the engagement-side clutch torque is determined from a map including a relationship between the vehicle speed and the engagement-side clutch torque according to the corrected engine torque.

The characteristics of the map are that the higher the vehicle speed is, the larger the engagement-side clutch torque is set, and the larger the corrected engine torque is, the larger the engagement-side clutch torque is set, so ultimately the engagement-side clutch torque is controlled to be increased according to the corrected engine torque.

When the time at which the torque phase is initiated and has progressed is longer than the target time to perform the torque phase, and the release-side clutch torque is below a predetermined value near 0 so it is determined that the release-side clutch has been substantially and completely released, the controller CLR determines that the handover step S20 is completed, and the next synchronization step S30 progresses.

In the synchronization step S30, the engagement-side clutch torque is determined as a larger value of a value of adding a ramp down torque to a value of subtracting the torque difference from the corrected engine torque in an immediately preceding control cycle, and a value of subtracting the torque difference from the basic engine torque.

Herein, when the engagement-side clutch torque is determined as the value of adding the ramp down torque to the value of subtracting the torque difference from the corrected engine torque in the immediately preceding control cycle, the torque difference is a difference between the corrected engine torque and the engagement-side clutch torque at the completion of the handover step S20, and as a result, the engagement-side clutch torque is gradually decreased by the amount of the ramp down torque from the value that has been maximally increased at the completion of the handover step S20.

The ramp down torque is a torque configured such that the engagement-side clutch torque is linearly reduced to converge from the maximum value at the completion of the handover step S20 to the basic engine torque during the synchronization step S30.

The obtaining of the engagement-side clutch torque in the synchronization step S30 is expressed by the following Equation 2.

$$Tcl\_App(t) = \max[Te\_A(t-1) - Tgap + Trpdn, \ Te - Tgap] \quad \text{[Equation 2]}$$

Herein,
Tcl_App: Engagement-side clutch torque
Te_A: Corrected engine torque
Tgap: Torque difference
Trpdn: Ramp down torque
Te: Basic engine torque Accordingly, the ramp down torque becomes a negative value.

In the synchronization step S30, the engine torque is reduced to less than the basic engine torque. In other words, the engine torque, which has been increased to the corrected engine torque higher than the basic engine torque in the handover step S20 to synchronize the engine speed with the engagement-side clutch speed, is reduced to less than the basic engine torque, so that the engine speed is rapidly synchronized with the engagement-side clutch speed connected to the target gear as shown in FIG. 3.

After the engine speed and the engagement-side clutch speed are synchronized with each other, the engine torque is gradually returned to the basic engine torque, so that the shift is completed.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift control method for a vehicle with a double clutch transmission (DCT), the control method comprising:
    an initiation determination step of determining, by a controller, when a power-on upshift is initiated;
    a handover step of, during a target time for the controller to perform a torque phase, releasing, by the controller, a release-side clutch, increasing, by the controller, an engine torque from a predetermined engine torque to a corrected engine torque in consideration of a gear ratio difference between a current gear and a target gear, and controlling, by the controller, an engagement-side clutch using an engagement-side clutch torque determined in consideration of the corrected engine torque and a vehicle speed; and
    when the handover step is completed, a synchronization step of reducing, by the controller, the engine torque while controlling the engagement-side clutch in consideration of a torque difference, which is a difference between the corrected engine torque and the engagement-side clutch torque at completion of the handover step, to perform an inertia phase such that an engine speed is synchronized with an engagement-side clutch speed.

2. The control method of claim 1,
    wherein, in the initiation determination step, the controller determines when gear engagement of the target gear is completed; and
    wherein the handover step is initiated when it is determined, by the controller, that the power-on upshift is initiated and the gear engagement of the target gear is completed in the initiation determination step.

3. The control method of claim 1,
    wherein the controller concludes that the handover step is completed, by determining that a time at which the torque phase is initiated and has progressed is longer than the target time, and the release-side clutch torque is below a predetermined value.

4. The control method of claim 1, wherein, in the handover step, the controller determines the corrected engine torque such that a difference between the predetermined engine torque multiplied by a gear ratio of the current gear and the predetermined engine torque multiplied by a gear ratio of the target gear is divided by the gear ratio of the target gear to provide a result, and the result is multiplied by a progress ratio of the torque phase and is added to the predetermined engine torque.

5. The control method of claim 1, wherein the controller determines the corrected engine torque such that a difference between the predetermined engine torque multiplied by a gear ratio of the current gear and the predetermined engine torque multiplied by a gear ratio of the target gear is divided by the gear ratio of the target gear to provide a result and the result is multiplied by a progress ratio of the torque phase and a correction factor determined according to the predetermined engine torque and the target gear and is added to the predetermined engine torque.

6. The control method of claim 1, wherein in the handover step, the engagement-side clutch torque is determined from a map including a relationship between the vehicle speed and the engagement-side clutch torque according to the corrected engine torque.

7. The control method of claim 1, wherein, in the synchronization step, the engagement-side clutch torque is determined as a larger value of a value of adding a ramp down torque to a value of subtracting the torque difference from the corrected engine torque in a preceding control cycle, and a value of subtracting the torque difference from the predetermined engine torque.

8. The control method of claim 1, wherein, in the synchronization step, the engine torque is reduced to less than the predetermined engine torque.

9. A shift control method for a vehicle with a double clutch transmission (DCT), the control method comprising:
    when a power-on upshift is initiated, during a target time for a controller to perform a torque phase, releasing, by the controller, a release-side clutch, increasing, by the controller, an engine torque to a predetermined engine torque or more than the predetermined engine torque, and increasing, by the controller, an engagement-side clutch torque according to an increase in the engine torque and a vehicle speed; and
    when the release-side clutch is completely released, the controller is configured to reduce the engine torque while reducing the engagement-side clutch torque to be equal to the predetermined engine torque, to perform an inertia phase such that an engine speed is synchronized with an engagement-side clutch speed.

10. The control method of claim 9,
    wherein the controller concludes that the release-side clutch is completely released, by determining that a time at which the torque phase is initiated and has progressed is longer than the target time, and the release-side clutch torque is below a predetermined value.

* * * * *